United States Patent
Li et al.

(10) Patent No.: US 9,563,064 B2
(45) Date of Patent: Feb. 7, 2017

(54) DISPLAY PROCESSING APPARATUS, SYSTEM AND METHOD

(71) Applicant: BOE TECHNOLOGY GROUP CO., LTD., Beijing (CN)

(72) Inventors: Yunfei Li, Beijing (CN); Ling Shi, Beijing (CN); Shiming Shi, Beijing (CN)

(73) Assignee: BOE TECHNOPLOGY GROUP CO., LTD., Beijing (CN)

( * ) Notice: Subject to any disclaimer, the term of this patent is extended or adjusted under 35 U.S.C. 154(b) by 74 days.

(21) Appl. No.: 14/345,774

(22) PCT Filed: Dec. 12, 2013

(86) PCT No.: PCT/CN2013/089164
§ 371 (c)(1),
(2) Date: Mar. 19, 2014

(87) PCT Pub. No.: WO2014/190723
PCT Pub. Date: Dec. 4, 2014

(65) Prior Publication Data
US 2015/0085002 A1 Mar. 26, 2015

(30) Foreign Application Priority Data
May 30, 2013 (CN) .......................... 2013 1 0210264

(51) Int. Cl.
*G09G 5/00* (2006.01)
*G02B 27/28* (2006.01)
(Continued)

(52) U.S. Cl.
CPC .............. *G02B 27/286* (2013.01); *G09G 3/36* (2013.01); *G02F 2001/133541* (2013.01);
(Continued)

(58) Field of Classification Search
CPC ............ G02B 27/01; G02B 2027/0134; G02B 27/286; G09G 3/36; G09G 2320/10; G09G 2320/068; G09G 2310/08; G02F 2001/133541; G02F 2001/133738
(Continued)

(56) References Cited

U.S. PATENT DOCUMENTS

2009/0079941 A1* 3/2009 Miller .................... G03B 21/28
353/8
2009/0121992 A1 5/2009 Asao et al.
(Continued)

FOREIGN PATENT DOCUMENTS

CN 102647608 A 8/2012
CN 102707450 A 10/2012
(Continued)

OTHER PUBLICATIONS

International Search Report for International Application No. PCT/CN2013/089164, 20pgs.
(Continued)

*Primary Examiner* — Jonathan Boyd
(74) *Attorney, Agent, or Firm* — Ladas & Parry LLP (57) ABSTRACT

A display processing apparatus is configured to process linearly polarized light emitted out from a display device. The display processing apparatus comprises a polarization conversion unit, wherein the polarization conversion unit is configured to convert the linearly polarized light into circularly polarized light in different rotation directions according to different display timings of the display device; the display timings include a first display time sequence point and at least one subsequent display time sequence point; a display signal corresponding to the first display time sequence point of the display device is a display signal of a first image, and a display signal corresponding to the subsequent display time sequence point is a display signal of a second image; and the polarization conversion unit converts linearly polarized light, emitted out from the display device during display at the first display time sequence point, into circularly polarized light in a first rotation direction, and convert linearly polarized light, emitted out from the display device during display at the subsequent display time sequence point, into circularly polarized light in a second rotation (Continued)

direction. A display system and a display method, which can greatly improve the confidential display effect, are further provided.

19 Claims, 3 Drawing Sheets

(51) Int. Cl.
*G09G 3/36* (2006.01)
*G02F 1/1335* (2006.01)
*G02F 1/1337* (2006.01)

(52) U.S. Cl.
CPC ............ *G02F 2001/133738* (2013.01); *G09G 2310/08* (2013.01); *G09G 2320/068* (2013.01); *G09G 2320/10* (2013.01)

(58) Field of Classification Search
USPC ........................................................ 345/7, 8
See application file for complete search history.

(56) References Cited

U.S. PATENT DOCUMENTS

| | | | | |
|---|---|---|---|---|
| 2010/0085373 A1* | 4/2010 | Miyasaka | ................ | G09G 5/00 345/589 |
| 2011/0169722 A1 | 7/2011 | Ogawa et al. | | |
| 2011/0221779 A1* | 9/2011 | Okumura | ............. | H04N 5/2254 345/649 |
| 2011/0261299 A1* | 10/2011 | Tai | ......................... | G02B 27/26 349/98 |
| 2012/0120330 A1* | 5/2012 | Lai | ......................... | G02B 27/26 349/15 |
| 2012/0212577 A1 | 8/2012 | Kim | | |

FOREIGN PATENT DOCUMENTS

| | | |
|---|---|---|
| CN | 202677021 U | 1/2013 |
| JP | 06-331958 | 2/1994 |
| WO | 2010038507 A1 | 8/2010 |

OTHER PUBLICATIONS

English translation of Japanese Patent Application No. 06-331958, 29pgs.
First Office Action issued by the Chinese Patent Office for Chinese Patent Application No. 201310210264.5 dated Mar. 18, 2015, 11pgs.
English language translation of First Office Action issued by the Chinese Patent Office for Chinese Patent Application No. 201310210264.5 dated Mar. 18, 2015, 13pgs.
English language Abstract of CN202677021U; 1 page.
International Preliminary Report on Patentability Appln. No, PCT/CN2013/089164, Dated Dec. 1, 2015.

* cited by examiner

DISPLAY PROCESSING APPARATUS, SYSTEM AND METHOD

CROSS REFERENCE TO RELATED APPLICATIONS

This application is based on International Application No. PCT/CN2013/089164 filed on Dec. 12, 2013, which claims priority to Chinese National Application No. 201310210264.5 filed on May 30, 2013. The entire contents of each and every foregoing application are incorporated herein by reference.

TECHNICAL FIELD

Embodiments of the present invention relate to a display processing apparatus, system and method.

BACKGROUND

Among flat-panel display devices, thin-film transistor liquid crystal displays (TFT-LCD) have the characteristics such as small size, low power consumption, relatively low manufacturing cost, low radiation (even non-radiation) and the like, and have dominated the current flat-panel display market.

The application of liquid crystal displays (LCD) to display confidential information also gradually comes into sight of people. The confidential information must be kept secret from certain groups and also must be viewed in certain situations. When the confidential information is viewed, if groups who are not allowed to view the confidential information are present, it is best to not allow the groups to view the confidential information, and only in this way, the best confidential effect can only be achieved.

Currently, a device that can realize the confidential display by reducing the viewing angle of a LCD has been introduced, namely the viewing angle of the display is made to be very narrow so that the people sitting directly in front of the display can view contents displayed on the display screen but the people sitting around cannot view the contents displayed on the display screen. However, this kind of confidential display device has a certain defect, namely the people around the observer can also view the contents displayed on the display if standing at the rear of the observer, and hence the confidential effect of the confidential display device may be poor.

SUMMARY

Embodiments of the present invention provide a display processing apparatus, system and method, which are configured to improve confidential display effect.

In one aspect, the present invention provides a display processing apparatus configured to process linearly polarized light emitted out from a display device. The display processing apparatus comprises a polarization conversion unit, wherein the polarization conversion unit is configured to convert the linearly polarized light into circularly polarized light in different rotation directions according to different display timings of the display device; the display timings include a first display time sequence point and at least one subsequent display time sequence point; a display signal corresponding to the first display time sequence point of the display device is a display signal of a first image; a display signal corresponding to the subsequent display time sequence point is a display signal of a second image; and the polarization conversion unit converts linearly polarized light, emitted out from the display device during display at the first display time sequence point, into circularly polarized light in a first rotation direction, and converts linearly polarized light, emitted during display at the subsequent display time sequence point, into circularly polarized light in a second rotation direction.

For instance, in the display processing apparatus, different display timings of the display device are different frames; the display signal corresponding to the first display time sequence point is a display signal of a first image frame; and the display signal corresponding to the subsequent display time sequence point is a display signal of a second image frame.

For instance, in the display processing apparatus, the first image frames and the second image frames are arranged in a form of interleaving one first image frame with every one second image frame. For instance, the first image frames and the second image frames are arranged in a form of interleaving one or more first image frames with of every second image frames.

For instance, in the display processing apparatus, the polarization conversion unit may include a quarter-wave retardation film, a first liquid crystal retardation plate and a first polarization control unit, in which the quarter-wave retardation film is configured to convert the linearly polarized light emitted out from the display device into initial circularly polarized light; the first liquid crystal retardation plate is configured to convert the initial circularly polarized light transmitted from the quarter-wave retardation film into the circularly polarized light in different rotation directions; and the first polarization control unit is configured to apply a first liquid crystal deflection voltage to the first liquid crystal retardation plate at the first display time sequence point so that the initial circularly polarized light corresponding to the first display time sequence point is converted into the circularly polarized light in the first rotation direction, and apply a second liquid crystal deflection voltage to the first liquid crystal retardation plate at the subsequent display time sequence point so that the initial circularly polarized light corresponding to the subsequent display time sequence point is converted into the circularly polarized light in the second rotation direction.

For instance, in the display processing apparatus, the polarization conversion unit may further include a second liquid crystal retardation plate and a second polarization control unit, and the second polarization control unit is configured to apply a third liquid crystal deflection voltage to the second liquid crystal retardation plate at the first display time sequence point so that the linearly polarized light, emitted out from the display device during display at the first display time sequence point, is converted into the circularly polarized light in the first rotation direction, and apply a fourth liquid crystal deflection voltage to the second liquid crystal retardation plate at the subsequent display time sequence point so that the linearly polarized light, emitted out from the display device during display at the subsequent display time sequence point, is converted into the circularly polarized light in the second rotation direction.

For instance, in the display processing apparatus, the polarization conversion unit may also convert the linearly polarized light into the circularly polarized light in different rotation directions according to different positions in a display image of the display device; and when a display signal corresponding to a first position in the display image is the display signal of the first image and a display signal corresponding to a second position is the display signal of the second image, the polarization conversion unit converts linearly polarized light, emitted out from the display device during display at the first position, into the circularly polarized light in the first rotation direction, and converts linearly polarized light, emitted during display at the second position, into the circularly polarized light in the second rotation direction.

For instance, in the display processing apparatus, different positions in the display image are different rows, different columns, different pixels or different regions; and correspondingly the first position is confidential rows, confidential columns, confidential pixels or confidential regions; and the second position is interference rows, interference columns, interference pixels or interference regions.

For instance, in the display processing apparatus, the first position and the second position are arranged in a form of interleaving at a same interval.

For instance, in the display processing apparatus, the polarization conversion unit may include a quarter-wave retardation film, a third liquid crystal retardation plate and a third polarization control unit, in which the quarter-wave retardation film is configured to convert the linearly polarized light emitted out from the display device into initial circularly polarized light; the third liquid crystal retardation plate is configured to convert the initial circularly polarized light transmitted from the quarter-wave retardation film into the circularly polarized light in different rotation directions; and the third polarization control unit is configured to apply a fifth liquid crystal deflection voltage to the third liquid crystal retardation plate at the first position so that the initial circularly polarized light corresponding to the first position is converted into the circularly polarized light in the first rotation direction, and apply a sixth liquid crystal deflection voltage to the third liquid crystal retardation plate at the second position so that the initial circularly polarized light corresponding to the second position is converted into the circularly polarized light in the second rotation direction.

For instance, in the display processing apparatus, the polarization conversion unit may further include a fourth liquid crystal retardation plate and a fourth polarization control unit, in which the fourth polarization control unit is configured to apply a seventh liquid crystal deflection voltage to the fourth liquid crystal retardation plate at the first position so that the linearly polarized light of an image displayed by the display device at the first position is converted into the circularly polarized light in the first rotation direction, and apply an eighth liquid crystal deflection voltage to the fourth liquid crystal retardation plate at the second position so that the linearly polarized light of an image displayed by the display device at the second position is converted into the circularly polarized light in the second rotation direction.

For instance, in the display processing apparatus, patterns of the first image and the second image have similar colors.

For instance, in the display processing apparatus, the second image is in a random mosaic pattern.

In another aspect, the present invention provides a display processing apparatus configured to process linearly polarized light emitted out from a display device, which comprises a polarization conversion unit configured to convert the linearly polarized light into circularly polarized light in different rotation directions according to different positions in a display image of the display device, wherein when a display signal corresponding to a first position in the display image is a display signal of a first image and a display signal corresponding to a second position is a display signal of a second image, the polarization conversion unit converts linearly polarized light, emitted out from the display device during display at the first position, into circularly polarized light in a first rotation direction, and converts linearly polarized light, emitted during display at the second position, into circularly polarized light in a second rotation direction.

For instance, in the display processing apparatus, different positions in the display image are different rows, different columns, different pixels or different regions; and correspondingly a first position is confidential rows, confidential columns, confidential pixels or confidential regions, and second position is interference rows, interference columns, interference pixels or interference regions.

For instance, in the display processing apparatus, the first position and the second position are arranged in the form of interleaving at a same interval.

For instance, the display device includes a first display time sequence point and at least one subsequent display time sequence point; a display signal corresponding to the first position at the first display time sequence point is a display signal of a first image, and a corresponding display signal at the subsequent display time sequence point is a display signal of a second image; and hence, in the display processing apparatus, the polarization conversion unit is configured to convert the linearly polarized light, emitted at the first position during display at the first display time sequence point, into the circularly polarized light in the first rotation direction, and convert the linearly polarized light, emitted during display at the subsequent display time sequence point, into the circularly polarized light in the second rotation direction.

In still another aspect, the present invention provides a display processing system, which comprises a display device for emitting linearly polarized light, any foregoing display processing apparatus and an analyzer for analyzing circularly polarized light in a first rotation direction.

For instance, in the system, the analyzer may be a pair of analyzer spectacles.

In still another aspect, the present invention provides a display processing method, which comprises: acquiring information of different display timings of a display device, in which the display timings include a first display time sequence point and at least one subsequent display time sequence point; a display signal corresponding to the first display time sequence point of the display device is a display signal of a first image; and a display signal corresponding to the subsequent display time sequence point is a display signal of a second image; and converting linearly polarized light, emitted out from the display device during display at the first display time sequence point, into circularly polarized light in a first rotation direction when the display device displays the display signal of the first image at the first display time sequence point, and converting linearly polarized light, emitted out from the display device during display at the at least one subsequent display time sequence point, into circularly polarized light in a second rotation direction when the display device displays the display signal of the second image at the subsequent display time sequence point.

In still another aspect, the present invention provides a display processing method, which comprises: acquiring display information of different positions in a display image of a display device; and converting linearly polarized light, emitted out from the display device during display at a first position, into circularly polarized light in a first rotation direction, and converting linearly polarized light, emitted during display at a second position, into circularly polarized light in a second rotation direction, when a display signal corresponding to the first position in the display image is a display signal of a first image and a display signal corresponding to the second position is a display signal of a second image.

For instance, the method may further comprise: acquiring information of different display timings of the display device, in which the display timings include a first display time sequence point and at least one subsequent display time sequence point; as for the first position, a corresponding display signal at the first display time sequence point is the display signal of the first image, and a corresponding display signal at the subsequent display time sequence point is the display signal of the second image; and converting linearly polarized light, emitted by the first position during display at the first display time sequence point, into the circularly polarized light in the first rotation direction, and converting linearly polarized light, emitted during display at the subsequent display time sequence point, into the circularly polarized light in the second rotation direction.

In the embodiment of the present invention, as the polarization conversion unit can convert the linearly polarized light emitted out from the display device into the circularly polarized light in different rotation directions according to different display timings of the display device, an overlapped state of the first image and the second image is displayed on a screen, and therefore observers cannot view effective image information on the screen in the situation of naked-eye observation, and consequently the confidential effect of the display device can be greatly improved.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

REFERENCE NUMERALS

1—LCD Panel 2—Quarter-wave Plate 3—Liquid Crystal Cell 4—Substrate 5—Liquid crystal layers 11—Light from Backlight 12—Linearly Polarized Light 13—Right-handed Circularly Polarized Light 14—Right-handed Circularly Polarized Light 15—Left-handed Circularly Polarized Light

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Unless otherwise defined, the technical or scientific terms used herein have normal meanings understood by those skilled in the art. The words "first", "second" and the like used in the description and the claims of the patent application of the present invention do not indicate the sequence, the number or the importance but are only used for distinguishing different components. Similarly, the words "a", "an", "the" and the like also do not indicate the number but only indicate at least one. The word "comprise", "include" or the like only indicates that an element or a component before the word contains elements or components listed after the word and equivalents thereof, not excluding other elements or components. The words "connected", "coupled" and the like are not limited to physical or mechanical connection but may include electrical connection, either directly or indirectly.

In order to improve the confidential display effect of a display device, the embodiment of the present invention provides a display processing apparatus, a display system, and a display method.

In one embodiment of the present invention, a polarization conversion unit converts linearly polarized light emitted out from a display device into circularly polarized light in different rotation directions according to different display timings of the display device, and hence a display image of the display device is presented as the overlapped state of circularly polarized light in different rotation directions corresponding to a confidential image and an interference image. As naked eyes cannot identify light which not only includes left-handed circularly polarized light but also includes right-handed circularly polarized light, displayed effective information cannot be identified. However, when a user of the confidential information adopts an analyzer for left-handed circularly polarized light or right-handed circularly polarized light, one type of information therein can be identified. Therefore, the embodiment of the present invention improves the confidential display effect. Herein, the confidential image is an example of a first image; correspondingly, a confidential frame is an example of a first image frame; a confidential image signal is an example of a first image signal; the interference image is an example of a second image; correspondingly, an interference frame is an example of a second image frame; and an interference image signal is an example of a second image signal.

The display timings in the embodiment of the present invention are defined according to the display time sequence of different images. In term of frame, different display timings refer to different frames. A video signal includes a plurality of successive frames which are displayed according to a time sequence. For instance, a confidential frame image is displayed at the first display time sequence point, and an interference frame image is displayed at at least one subsequent display time sequence point. Circularly polarized light includes left-handed circularly polarized light and right-handed circularly polarized light, namely circularly polarized light in different rotation directions mentioned in the application.

One embodiment of the present invention provides a display processing apparatus configured to process linearly polarized light emitted out from a display device. The display processing apparatus comprises a polarization conversion unit, and the polarization conversion unit is configured to convert the linearly polarized light into circularly polarized light in different rotation directions according to different display timings of the display device; the display timings include a first display time sequence point and at least one subsequent display time sequence point; a display signal corresponding to the first display time sequence point of the display device is a display signal of a confidential image, and a display signal corresponding to the subsequent display time sequence point is a display signal of an interference image; and the polarization conversion unit converts linearly polarized light, emitted out from the display device during display at the first display time sequence point, into circularly polarized light in a first rotation direction, and converts linearly polarized light, emitted during display at the subsequent display time sequence point, into circularly polarized light in a second rotation direction.

Herein, the "first display time sequence point" and the "subsequent display time sequence point" are only used for the convenience of description. The "first display time sequence point" refers to certain time sequence points selected from a video signal but not necessarily an initial time sequence point; and the "subsequent display time sequence point" refers to one or more time sequence points immediately after the "first display time sequence point", and for instance, can be sequentially referred to as a second display time sequence point.

In the display processing apparatus in the embodiment of the present invention, as the polarization conversion unit can convert the linearly polarized light emitted out from the display device into the circularly polarized light in different rotation directions according to different display timings of the display device, the overlapped state of the confidential image and the interference image is presented on a screen, and hence observers cannot view effective image information on the screen in the situation of naked-eye observation. Therefore, with the display processing apparatus provided by the embodiment of the present invention, the confidential effect of the display device can be greatly improved.

For instance, different display timings of the display device are different frames; a display signal corresponding to the first display time sequence point is a display signal of a confidential frame; and a display signal corresponding to the subsequent display time sequence point is a display signal of an interference frame. For instance, the confidential frames and the interference frames are arranged in the form of inserting one confidential frame at the interval after every one interference frame. For instance, the confidential frames and the interference frames are arranged in the form of inserting one or more (more than two) confidential frames at the interval after every (more than two) interference frames, and the plurality of inserted confidential frames are mutually successive.

In one embodiment of the present invention, for instance, the confidential frames correspond to the first display time sequence point. The selection mode of the confidential frames may be various: one confidential frame is inserted at the interval after every one interference frame; one or more confidential frames are inserted at the interval after every interference frames; and the number of the interference frames interposed between the confidential frames may not be all the same, and two interference frames, three interference frames or the like may be interposed therebetween at once. The confidential frames may also be successive.

In the display processing apparatus provided by the embodiment of the present invention, different polarization states of light can be converted according to different positions. For instance, the polarization conversion unit is also configured to convert linearly polarized light into circularly polarized light in different rotation directions according to different positions in a display image of the display device. Where a display signal corresponding to a first position in the display image is a display signal of a confidential image and a display signal corresponding to a second position is a display signal of an interference image, the polarization conversion unit converts linearly polarized light, emitted out from the display device during display at the first position, into circularly polarized light in a first rotation direction, ad converts linearly polarized light, emitted during display at the second position, into circularly polarized light in a second rotation direction.

For instance, different positions in the display image are different rows, different columns, different pixels or different regions. For instance, the first positions are confidential rows, confidential columns, confidential pixels or confidential regions, and the second positions are interference rows, interference columns, interference pixels or interference regions. For instance, the confidential rows and the interference rows are arranged at the interval after every one or more rows. Similarly, the confidential columns and the interference columns may also be arranged at the interval after every one or more columns.

In the embodiment of the present invention, different positions involves the case in which the confidential image and the interference image are at different display positions in the display device and may be in different rows, different columns, different pixels or different regions of the display device. The region may be artificially divided. For instance, a display image is divided into a plurality of regions; and confidential regions and interference regions are arranged in an interleave mode. The size and the specific sequence form of the regions are unlimited as long as the objective of interfering with the visual effect and keeping image information confidential can be achieved.

In another embodiment of the present invention, the embodiment of "controlling the display information according to different display timings" and the embodiment of "controlling the display information according to different positions in the display image" may be combined with each other to further improve the confidential effect of the display device. In the embodiment, for instance, secondary encryption is conducted by "distinguishing confidential information and interference signals through timings" on the basis of "distinguishing the confidential information and the interference signals through spatial positions", so that better confidential effect can be achieved, and meanwhile, the problem of crosstalk and interference can be further avoided and better image display effect can be achieved. The specific combination mode is illustrated as follows.

For instance, in the process of continuous display of the display device of the embodiment, in the case of an odd frame, confidential signals are displayed in odd rows of the image, and interference signals are displayed in even rows; in the case of an even frame, the confidential signals are displayed in the even rows of the image, and the interference signals are displayed in the odd rows. That is to say, in the case of the odd frame, the corresponding polarization conversion unit converts linearly polarized light in the odd rows into circularly polarized light in a first rotation direction, and converts linearly polarized light in the even rows into circularly polarized light in a second rotation direction; and in the case of the even frame, the corresponding polarization conversion unit converts the linearly polarized light in the even rows into the circularly polarized light in the first rotation direction and the linearly polarized light in the odd rows into the circularly polarized light in the second rotation direction. Therefore, the polarization conversion unit not only can distinguish the rotation direction of the circularly polarized light based on the positions of the image but also can change the distinguishing mode based on different frames. When the timings are different, the distinguishing mode is also changed.

The foregoing is only illustrative and is illustrated by taking row distinguishing as a position distinguishing mode and frame distinguishing as a timing distinguishing mode for example. However, in the embodiment of the present invention, the combination mode of the timing mode and the position mode is not limited to this type.

In the embodiment of adjustment and control according to different display timings, for instance, the polarization conversion unit may have the following two kinds of structure.

As for a first kind of structure, the polarization conversion unit includes a quarter-wave retardation film, a first liquid crystal retardation plate and a first polarization control unit. The quarter-wave retardation film is configured to convert the linearly polarized light emitted out from the display device into initial circularly polarized light; the first liquid crystal retardation plate is configured to convert the initial circularly polarized light transmitted from the quarter-wave retardation film into the circularly polarized light in different rotation directions; and the first polarization control unit is configured to apply a first liquid crystal deflection voltage to the first liquid crystal retardation plate at the first display time sequence point so that the initial circularly polarized light corresponding to the first display time sequence point can be converted into the circularly polarized light in the first rotation direction, and apply a second liquid crystal deflection voltage to the first liquid crystal retardation plate at the subsequent display time sequence point so that the initial circularly polarized light corresponding to the subsequent display time sequence point can be converted into the circularly polarized light in the second rotation direction.

As for a second kind of structure, the polarization conversion unit includes a second liquid crystal retardation plate and a second polarization control unit. The second polarization control unit is configured to apply a third liquid crystal deflection voltage to the second liquid crystal retardation plate at the first display time sequence point so that the linearly polarized light, emitted out from the display device during display at the first display time sequence point, can be converted into the circularly polarized light in the first rotation direction, and apply a fourth liquid crystal deflection voltage to the second liquid crystal retardation plate at the subsequent display time sequence point so that the linearly polarized light, emitted out from the display device during display at the subsequent display time sequence point, can be converted into the circularly polarized light in the second rotation direction.

In the above second structure, the second liquid crystal retardation plate is, for instance, provided with a liquid crystal cell (a liquid crystal light valve) having the function of directly converting linearly polarized light into circularly polarized light in different rotation directions. The linearly polarized light can be converted into the circularly polarized light in different rotation directions at different timings by the liquid crystal cell.

For instance, in embodiments of adjustment and control according to different positions in the display image of the display device, the polarization conversion unit may also have the following two kinds of structure.

As for a first kind of structure, the polarization conversion unit includes a quarter-wave retardation film, a third liquid crystal retardation plate and a third polarization control unit; the quarter-wave retardation film is configured to convert the linearly polarized light emitted out from the display device into initial circularly polarized light; the third liquid crystal retardation plate is configured to convert the initial circularly polarized light transmitted from the quarter-wave retardation film into circularly polarized light in different rotation directions; and the third polarization control unit is configured to apply a fifth liquid crystal deflection voltage to the third liquid crystal retardation plate at a first position so that the initial circularly polarized light corresponding to the first position can be converted into the circularly polarized light in the first rotation direction, and apply a sixth liquid crystal deflection voltage to the third liquid crystal retardation plate at a second position so that the initial circularly polarized light corresponding to the second position can be converted into the circularly polarized light in the second rotation direction.

As for a second kind of structure, the polarization conversion unit includes a fourth liquid crystal retardation plate and a fourth polarization control unit; the fourth polarization control unit is configured to apply a seventh liquid crystal deflection voltage to the fourth liquid crystal retardation plate at the first position so that linearly polarized light of an image displayed by the display device at the first position can be converted into the circularly polarized light in the first rotation direction, and apply an eighth liquid crystal deflection voltage to the fourth liquid crystal retardation plate at the second position so that linearly polarized light of an image displayed by the display device at the second position can be converted into the circularly polarized light in the second rotation direction.

In the above second kind of structure, the fourth liquid crystal retardation plate is, for instance, provided with a liquid crystal cell (a liquid crystal light valve) having the function of directly converting the linearly polarized light into the circularly polarized light in different rotation directions. The linearly polarized light can be converted into the circularly polarized light in different rotation directions at different positions by the liquid crystal cell.

The first polarization control unit, the second polarization control unit, the third polarization control unit and the fourth polarization control unit, for instance, may be implemented in the form of an integrated circuit (IC) and connected to electrodes of the first liquid crystal retardation plate, the second liquid crystal retardation plate, the third liquid crystal retardation plate and the fourth liquid crystal retardation plate respectively.

Specific examples will be described below to illustrate the display processing apparatus provided by the embodiment but are not limited to the following examples. For instance, the quarter-wave retardation film is a quarter-wave plate. In the description below, first image information and second image information correspond to a confidential image and an interference image respectively.

First Embodiment

Figure 1A:
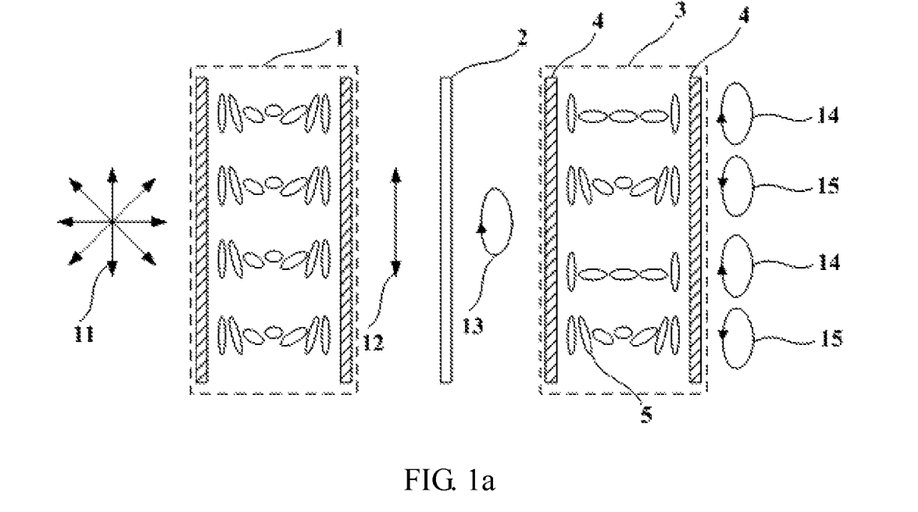
FIG. 1a is a schematic structural view of a first embodiment of a display device of the present invention.

As illustrated in FIG. 1a, the display system of the first embodiment of the present invention comprises a liquid crystal display (LCD) provided with a backlight (not shown in the figure) and an LCD panel 1. Moreover, the display system further comprises: a quarter-wave plate 2 disposed on one side of the LCD panel 1 away from the backlight (the right side in the figure), and a liquid crystal cell 3 disposed on one side of the quarter-wave plate 2 away from the LCD panel 1. The liquid crystal cell 3 includes two substrates 4 and a liquid crystal layer 5 disposed between the two substrates; and a transparent electrode is disposed on one surface of each substrate 4 facing the liquid crystal layer 5. The first embodiment as shown in FIG. 1a may involve the situation of "controlling the display information according to different positions in the display image".

Herein, the LCD is an example of the display device, and the liquid crystal cell 3 is an example of the liquid crystal retardation plate. A driving unit for controlling electrodes of the liquid crystal cell 3 is not shown in the figure. The driving unit is an example of the polarization control unit.

Figure 1B:
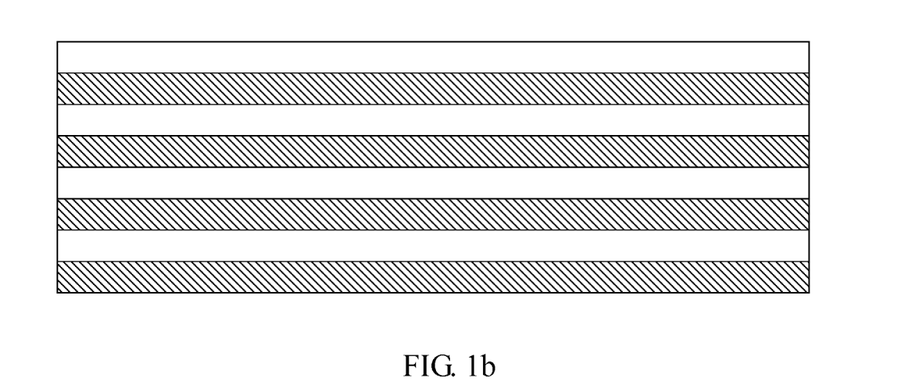
FIG. 1b is a schematic diagram of the parallel strip electrodes in a liquid crystal cell.

The LCD emits first linearly polarized light for displaying the first image information and second linearly polarized light for displaying the second image information at an interleave mode with an interval of one row (for instance, pixel row). The liquid crystal cell 3 may be the liquid crystal cell adopting various electric field modes. For instance, a transparent electrode of one substrate in the liquid crystal cell 3 is formed of a plurality of strip electrode units corresponding to corresponding rows of the first image information, for instance, parallel strip electrode units. As illustrated in FIG. 1b, the strip portions indicate mutually parallel strip electrode units; and a transparent electrode of the other substrate is a planar electrode covering the surface of the substrate.

Where a voltage more than a predetermined threshold voltage is applied to the strip electrode units, the liquid crystal cell 3 converts emergent light of the first polarized light passing through the quarter-wave plate 2 into the circularly polarized light in the first rotation direction, and converts emergent light of the second polarized light passing through the quarter-wave plate 2 into the circularly polarized light in the second rotation direction.

In the technical proposal of the embodiment, the light emitted out from the backlight 11 (generally natural light) is converted into linearly polarized light 12 by the LCD 1, and then converted into left-handed circularly polarized light or right-handed circularly polarized light by the quarter-wave plate 2. Where a voltage more than a predetermined threshold voltage is applied to the strip electrodes of the liquid crystal cell 3, namely where the voltage is a relatively high voltage, the alignment of liquid crystal molecules in the rows corresponding to the first image information is parallel to the propagation direction of incident light, and the rotation direction of the circularly polarized light is unchanged; and the alignment of liquid crystal molecules in the rows corresponding to the second image information is in a deflected state, and the rotation direction of the circularly polarized light is reversed. Description is given herein by only taking the case that the emergent light emitted out of the quarter-wave plate is right-handed circularly polarized light as an example.

Figure 2:
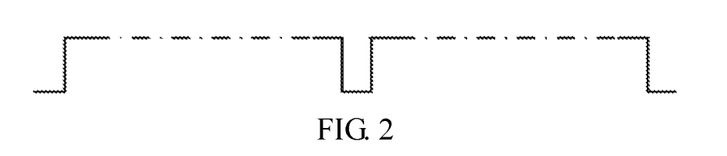
FIG. 2 is an oscillogram of a voltage applied to the liquid crystal cell in the first embodiment of the display device of the present invention.

The rows for displaying the first image information in the LCD correspond to the strip electrode units of the substrate in the liquid crystal cell 3. A voltage is applied to the strip electrodes, and the oscillogram of the applied voltage is as shown in FIG. 2. The alignment of liquid crystal molecules of the liquid crystal layers 5 in the rows corresponding to the first image information is parallel to the propagation direction of right-handed circularly polarized light 13. Therefore, the rotation direction of right-handed circularly polarized light 13 in the rows corresponding to the strip electrodes is unchanged, and the light emitted out from the liquid crystal cell 3 is still right-handed circularly polarized light 14. Correspondingly, the rows of the liquid crystal cell 3, corresponding to the second image information displayed by the LCD panel 1, are not acted on by the electric field, and liquid crystal molecules are twisted; at this time, the corresponding portion of the liquid crystal cell 3 is equivalent to a half-wave plate, so that the right-handed circularly polarized light 13 entering the portion of the liquid crystal cell 3 can be converted into left-handed circularly polarized light 15. Therefore, the observers can view overlapped light of the right-handed circularly polarized light 14 and left-handed circularly polarized light 15, and therefore cannot identify with naked eyes. The voltage applied to the strip electrodes cannot be always a voltage in a single direction because the voltage in the single direction can polarize the liquid crystal molecules. Therefore, the oscillogram of the applied voltage is as shown in FIG. 2. Dotted lines in FIG. 2 indicate that the horizontal voltage has a long duration period, namely a short period of reverse voltage is applied after a period of the voltage in the single direction is applied, so that the polarization of the liquid crystal molecules can be prevented.

In the embodiment of the present invention, strip electrodes may be additionally disposed in the rows corresponding to the liquid crystal cell for displaying the second image information, and therefore two proposals can be provided. One proposal is as mentioned above: the voltage is applied to the corresponding strip electrodes for displaying the first image information, and no voltage is applied to the corresponding strip electrodes for displaying the second image information; and the other proposal is opposite: the voltage is applied to the corresponding strip electrodes for displaying the second image information, and no voltage is applied to the corresponding strip electrodes for displaying the first image information. Both the two proposals can achieve the objective that the light emitted out from the liquid crystal cell is the overlapped light of the circularly polarized light in two rotation directions so that effective images cannot be identified by naked eyes.

In one modification of the first embodiment, secondary encryption is conducted by "distinguishing confidential information and interference signals through timing sequences" on the basis of "distinguishing the confidential information and the interference signals through spatial positions".

The LCD includes a first display time sequence point and at least one subsequent display time sequence point. For instance, as for the first position, the corresponding display signal on the LCD at the first display time sequence point is the display signal of a confidential image, and the corresponding display signal at the subsequent display time sequence point is the display signal of an interference image. The polarization conversion unit including the quarter-wave plate 2 and the liquid crystal cell 3 converts the linearly polarized light, emitted out at the first position of the LCD during display at the first display time sequence point, into the circularly polarized light in the first rotation direction, and converts the linearly polarized light, emitted during display at the subsequent display time sequence point, into the circularly polarized light in the second rotation direction. In this case, the display signals corresponding to the second position of the LCD at the first display time sequence point and the subsequent display time sequence point may be the display signals of interference images, or may be the display signal of an interference image and the display signal of a confidential image respectively.

Second Embodiment

Figure 3A:
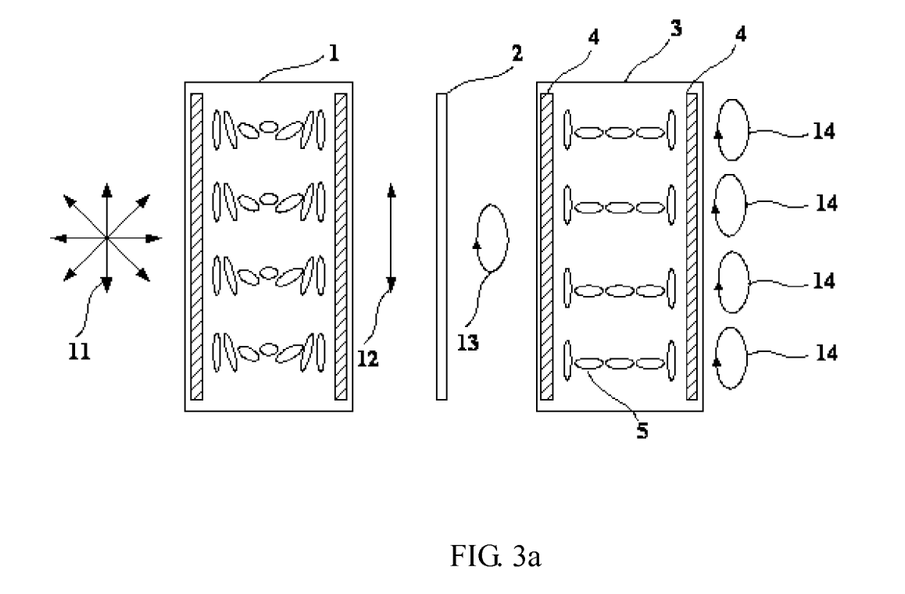
FIGS. 3a and 3b are respectively schematic diagrams of a second embodiment of the display device of the present invention under different voltage states.
Figure 3B:
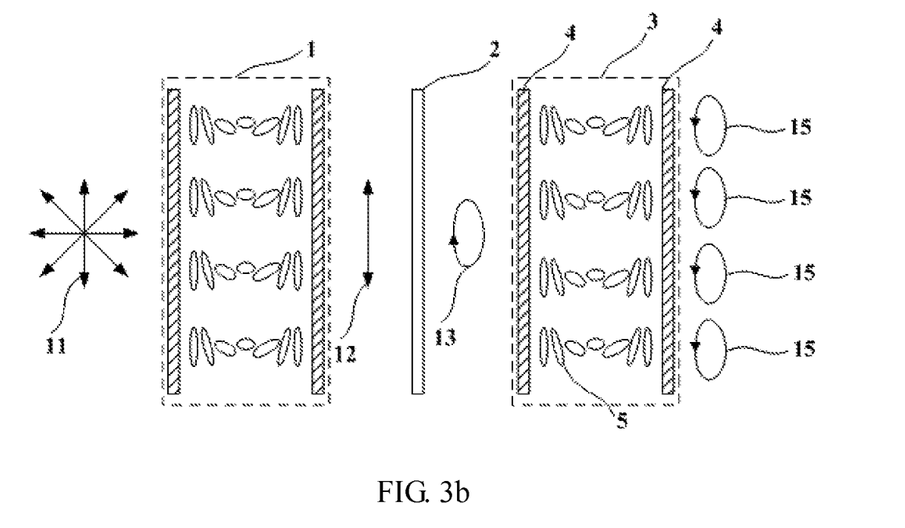

FIGS. 3a and 3b are schematic diagrams of the display system of the second embodiment under different voltage states. The display system comprises an LCD provided with a backlight (not shown in the figure) and an LCD panel 1, and further comprises: a quarter-wave plate 2 disposed on one side of the LCD panel 1 away from the backlight (the right side in the figure), and a liquid crystal cell 3 disposed on one side of the quarter-wave plate 2 away from the LCD panel 1. The liquid crystal cell 3 includes two substrates 4 and a liquid crystal layer 5 disposed between the two substrates 4; and a transparent electrode is disposed on one surface of each substrate 4 facing the liquid crystal layer 5. The second embodiment as shown in FIGS. 3a and 3b may involve the situation of "controlling the display information according to different display timings".

First linearly polarized light of one frame of first image information and second linearly polarized light of one frame of second image information are emitted out by the LCD in an interleave mode. The transparent substrate of each substrate 4 of the liquid crystal cell 3 is a planar electrode for covering the surface of the substrate.

Where the first linearly polarized light is emitted out by the LCD, a voltage more than a predetermined threshold voltage is applied to the liquid crystal cell 3, and the liquid crystal cell 3 converts the emergent light of the first linearly polarized light passing through the quarter-wave plate 2 into circularly polarized light in a first rotation direction; and where the second linearly polarized light is emitted out by the LCD, a voltage not more than the predetermined threshold voltage is applied or no voltage is applied to the liquid crystal cell 3, and the liquid crystal 3 converts the emergent light of the second linearly polarized light passing through the quarter-wave plate 2 into circularly polarized light in a second rotation direction.

Figure 4:
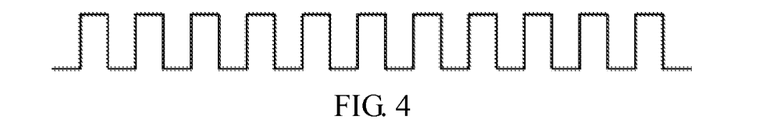
FIG. 4 is an oscillogram of a periodic voltage applied to the liquid crystal cell in the second embodiment of the display device of the present invention.

In the technical proposal of the embodiment, as illustrated in FIG. 3a which is an optical path diagram of one frame of first image information displayed by the LCD panel, light 11 (generally natural light) emitted out by the backlight is converted into linearly polarized light 12 by the LCD panel 1, and then converted into left-handed circularly polarized light or right-handed circularly polarized light by the quarter-wave plate 2. Where a periodic voltage is applied to a planar electrode of the liquid crystal cell 3, in the case of high voltage of the periodic voltage, namely when the voltage is more than the predetermined threshold voltage, the alignment of liquid crystal molecules is parallel to the propagation direction of incident light, and the rotation direction of the circularly polarized light is unchanged; and in the case of low voltage of the periodic voltage, namely when the voltage is not more than the predetermined threshold voltage or no voltage is applied, the alignment of the liquid crystal molecules is deflected, and the rotation direction of the circularly polarized light is overturned. For instance, the period of the periodic voltage is consistent with the frame period of the LCD panel; and for instance, a timing synchronizer may be further provided so that the two periods can be synchronized with each other. Description is only given herein by taking the case that the light emitted out from the quarter-wave plate is right-handed circularly polarized light as an example. Herein, the periodic voltage applied to the liquid crystal cell 3 is the high voltage as illustrated in FIG. 4. At this point, liquid crystal molecules in the liquid crystal cell 3 is perpendicular to the substrate, namely the alignment of the liquid crystal molecules is the same as the propagation direction of the incident right-handed circularly polarized light 13. Therefore, the rotation direction of the circularly polarized light emitted out from the liquid crystal cell 3 is unchanged and the circularly polarized light is still the right-handed circularly polarized light 14.

As illustrated in FIG. 3b which is an optical path diagram illustrating the state when the LCD panel displays one frame of interference information, the light 11 of the backlight is converted into the linearly polarized light 2 by the LCD panel 1, and then converted into left-handed circularly polarized light or right-handed circularly polarized light by the quarter-wave plate 2. Description is only given herein by taking the case that the light emitted out from the quarter-wave plate is right-handed circularly polarized light as an example. Herein, the periodic voltage applied to the liquid crystal cell 3 is as shown by the low voltage in FIG. 4. The low voltage may also be replaced by the case that no voltage is applied, namely the voltage is zero. At this point, the alignment of the liquid crystal molecules in the liquid crystal cell 3 is deflected, and the liquid crystal molecules are equivalent to a half-wave plate. Therefore, the rotation direction of the circularly polarized light emitted out from the liquid crystal cell 3 is changed, and the circularly polarized light is converted into left-handed circularly polarized light 15.

The display system of the present invention is not limited to the above two embodiments as long as the first linearly polarized light and the second linearly polarized light are converted into the circularly polarized light in different rotation directions after running through the quarter-wave plate and then through the liquid crystal cell applied with a voltage. As for the first embodiment, the first image information and the second image information not only can be displayed in an interleave mode with an interval of one row but also can be displayed in an interleave mode with an interval of one column, may also be displayed in an interleave mode with an interval of two rows or two columns, and may also be displayed in an interleave mode with an interval of more rows or more columns. If the first image information and the second image information are displayed in an interleave mode with an interval of one column, corresponding transparent strip electrodes of the liquid crystal cell are disposed in the columns of the substrate corresponding to the first image information. As for the second embodiment, the first image information and the second image information may be displayed in an interleave mode with an interval of one frame, and may also be displayed in an interleave mode with an interval of two or more frames.

When the embodiment of "controlling the display information according to different display timings" and the embodiment of "controlling the display information according to different positions in the display image" are combined with each other, for instance, the basic structure of the polarization conversion unit of the display system may be the structure as shown in FIG. 1b, but strip electrodes are disposed in corresponding rows of the liquid crystal cell for displaying the first image information and the second image information respectively. The two types of electrodes are parallel to and interleaved with each other, and the width is, for instance, equal to each other. If the same voltage is applied to the corresponding strip electrodes for displaying the first image information and the second image information at the same time, the two types of strip electrodes can have the function of planar electrodes as a whole. If different voltages are applied to the corresponding strip electrodes for displaying the first image information and the second image information respectively, the corresponding regions may be respectively controlled to perform different conversions on transmitted linearly polarized light in different regions.

For instance, patterns of the first image information and the second image information in the above embodiment have similar colors.

In the embodiment of the present invention, if the first image information is confidential information and the second image information is interference information, then there are various options for the patterns of the interference information. In principle, patterns of which the color is similar to that of patterns of the confidential information should be selected, so that good interference effect can be achieved. In the case of inappropriate selection, the confidential pattern and the interference pattern have relatively large color difference, and hence naked eye observers with may faintly view the confidential information.

For instance, the first image information is a confidential pattern, and the second image information is in a random mosaic pattern.

In the embodiment of the present invention, there are various types of patterns for the interference information. A random mosaic pattern is preferable. A mosaic pattern has a good shielding effect and is applicable to be the interference information.

Currently, main display modes of the display device include twisted nematic (TN) mode, vertical alignment (VA) mode, in-plane switching (IPS) mode, advanced super dimension switch (AD-SDS or ADS) mode, optically compensated bend (OCB) mode and the like. The OCB mode is widely applied due to an improved viewing angle and a higher response speed.

In the embodiment of the present invention, the liquid crystal cell may adopt any of the above display modes, and for instance, the liquid crystal cell preferably adopts the OCB mode.

Third Embodiment

The embodiment of the present invention further provides a display system, which comprises a display device for emitting linearly polarized light, any one of the foregoing display processing apparatus and an analyzer for analyzing circularly polarized light in a first rotation direction.

In the embodiment of the present invention, an analyzer used together with the display device must be provided and carried by groups for observing confidential information so that the groups can view the confidential information conveniently. The polarization state of the analyzer must be consistent with that of emergent light corresponding to the confidential information. For instance, if the emergent light containing the confidential information is right-handed circularly polarized light, a right-handed circular polarization analyzer must be equipped. The analyzer may have various forms, for instance, an analyzer lens provided with a handle, as long as human eyes can observe the screen of the display device through the analyzer lens.

For instance, the analyzer may be a pair of analyzer spectacles.

In the embodiment of the present invention, in order for the analyzer to be more conveniently used, the analyzer may be designed to be the analyzer spectacles. The observer can conveniently observe the confidential information in the display device by wearing the analyzer spectacles.

Fourth Embodiment

The embodiment provides a display processing method. The method comprises: acquiring information of different display timings of a display device, in which the display timings include a first display time sequence point and at least one subsequent display time sequence point; a display signal corresponding to the first display time sequence point of the display device is a display signal of a confidential image; and a display signal corresponding to the subsequent display time sequence point is a display signal of an interference image; converting linearly polarized light, emitted out from the display device during display at the first display time sequence point, into circularly polarized light in a first rotation direction when the display device displays the display signal of the confidential image at the first display time sequence point; and converting linearly polarized light, emitted out from the display device during display at the at least one subsequent display time sequence point, into circularly polarized light in a second rotation direction when the display device displays the display signal of the interference image at the subsequent display time sequence point.

The embodiment further provides a display processing method. The method comprises: acquiring display information of different positions in a display image of a display device; and converting linearly polarized light, emitted out from the display device during display at a first position, into circularly polarized light in a first rotation direction, and converting linearly polarized light, emitted during display at a second position, into circularly polarized light in a second rotation direction, when a display signal corresponding to the first position in the display image is a display signal of a first image and a display signal corresponding to the second position is a display signal of a second image For instance, the method may further comprise: acquiring information of different display timings of the display device, in which the display timings include a first display time sequence point and at least one subsequent display time sequence point, and as for the first position, a corresponding display signal at the first display time sequence point is the display signal of the first image, and a corresponding display signal at the subsequent display time sequence point is the display signal of the second image; and converting linearly polarized light, emitted by the first position during display, at the first display time sequence point into the circularly polarized light in the first rotation direction and linearly polarized light, emitted during display at the subsequent display time sequence point, into the circularly polarized light in the second rotation direction.

The foregoing is only the preferred embodiments of the present invention and not intended to limit the scope of protection of the present invention. The scope of protection of the present invention should be defined by the appended claims.

The invention claimed is:

1. A display processing apparatus configured to process linearly polarized light emitted out from a display device, comprising a polarization conversion unit configured to convert the linearly polarized light into circularly polarized light in different rotation directions according to different positions in a display image of the display device and different display timings of the display device, wherein the display timings include a first display time sequence point and at least one subsequent display time sequence point; display signals corresponding to the first display time sequence point and the subsequent display time sequence point of the display device at a first position in the display image of the display device are a display signal of a first image and display signal of a second image respectively, and display signals corresponding to the first time sequence point and the subsequent display time sequence point at a second position in the display image of the display device are a display signal of the second image; and the polarization conversion unit is configured to convert the linearly polarized light, emitted out from the display device during display at the first display time sequence point at the first position, into circularly polarized light in a first rotation direction, convert linearly polarized light, emitted out from the display device during display at the subsequent display time sequence point at the first position, into circularly polarized light in a second rotation direction, and convert the linearly polarized light emitted out from the display device during display at the first display time sequence point and the subsequent display time sequence point at the second position into circularly polarized light in the second rotation.

2. The display processing apparatus according to claim 1, wherein the different display timings of the display device are different frames;

the display signal corresponding to the first display time sequence point is a display signal of a first image frame; and the display signal corresponding to the subsequent display time sequence point is a display signal of a second image frame.

3. The display processing apparatus according to claim 2, wherein the first image frames and the second image frames are arranged in a form of interleaving one first image frame with every one second image frame.

4. The display processing apparatus according to claim 2, wherein the first image frames and the second image frames are arranged in a form of interleaving one or more first image frames with of every second image frames.

5. The display processing apparatus according to claim 1, wherein different positions in the display image are different rows, different columns, different pixels or different regions; correspondingly the first position is confidential rows, confidential columns, confidential pixels or confidential regions, and the second position is interference rows, interference columns, interference pixels or interference regions.

6. The display processing apparatus according to claim 1, wherein the first position and the second position are arranged in a form of interleaving at a same interval.

7. The display processing apparatus according to claim 1, wherein the polarization conversion unit includes a quarter-wave retardation film, a first liquid crystal retardation plate and a first polarization control unit, the quarter-wave retardation film is configured to convert the linearly polarized light emitted out from the display device into initial circularly polarized light;

the first liquid crystal retardation plate is configured to convert the initial circularly polarized light transmitted from the quarter-wave retardation film into the circularly polarized light in different rotation directions; and the first polarization control unit is configured to apply a first liquid crystal deflection voltage to the first liquid crystal retardation plate at the first display time sequence point so that the initial circularly polarized light corresponding to the first display time sequence point is converted into the circularly polarized light in the first rotation direction, and apply a second liquid crystal deflection voltage to the first liquid crystal retardation plate at the subsequent display time sequence point so that the initial circularly polarized light corresponding to the subsequent display time sequence point is converted into the circularly polarized light in the second rotation direction.

8. The display processing apparatus according to claim 1, wherein the polarization conversion unit includes a second liquid crystal retardation plate and a second polarization control unit, the second polarization control unit is configured to apply a third liquid crystal deflection voltage to the second liquid crystal retardation plate at the first display time sequence point so that the linearly polarized light, emitted out from the display device during display at the first display time sequence point, is converted into the circularly polarized light in the first rotation direction, and apply a fourth liquid crystal deflection voltage to the second liquid crystal retardation plate at the subsequent display time sequence point so that the linearly polarized light, emitted out from the display device during display at the subsequent display time sequence point, is converted into the circularly polarized light in the second rotation direction.

9. The display processing apparatus according to claim 1, wherein the polarization conversion unit includes a quarter-wave retardation film, a third liquid crystal retardation plate and a third polarization control unit, the quarter-wave retardation film is configured to convert the linearly polarized light emitted out from the display device into initial circularly polarized light;

the third liquid crystal retardation plate is configured to convert the initial circularly polarized light transmitted from the quarter-wave retardation film into the circularly polarized light in different rotation directions; and the third polarization control unit is configured to apply a fifth liquid crystal deflection voltage to the third liquid crystal retardation plate at the first position so that the initial circularly polarized light corresponding to the first position can be converted into the circularly polarized light in the first rotation direction, and apply a sixth liquid crystal deflection voltage to the third liquid crystal retardation plate at the second position so that the initial circularly polarized light corresponding to the second position can be converted into the circularly polarized light in the second rotation direction.

10. The display processing apparatus according to claim 1, wherein the polarization conversion unit includes a fourth liquid crystal retardation plate and a fourth polarization control unit, the fourth polarization control unit is configured to apply a seventh liquid crystal deflection voltage to the fourth liquid crystal retardation plate at the first position so that the linearly polarized light of an image displayed by the display device at the first position is converted into the circularly polarized light in the first rotation direction, and apply an eighth liquid crystal deflection voltage to the fourth liquid crystal retardation plate at the second position so that the linearly polarized light of an image displayed by the display device at the second position is converted into the circularly polarized light in the second rotation direction.

11. The display processing apparatus according to claim 1, wherein patterns of the first image and the second image have similar colors.

12. The display processing apparatus according to claim 11, wherein the second image is in a random mosaic pattern.

13. A display processing apparatus configured to process linearly polarized light emitted out from a display device, comprising a polarization conversion unit configured to convert the linearly polarized light into circularly polarized light in different rotation directions according to different positions in a display image of the display device and a different display timings of the device, wherein the display timings include a first display time sequence point and at least one subsequent display time sequence point, when a display signal corresponding to a first display time sequence point at a first position in the display image is a display signal of a first image, a signal corresponding to the subsequent display time sequence at the first position is a display of a second image, a display signal corresponding to the first display time sequence point at a second position in the display image is a display signal of the second image and a display signal corresponding to the subsequent display time sequence point at the second position is a display signal of the first image, the polarization conversion unit converts linearly polarized light, emitted out from the display device during display at the first display time sequence at the first position, into circularly polarized light in a first rotation direction, coverts linearly polarized light, emitted out from the display device during display at the subsequent display time sequence at the first position into circularly polarized light in a second rotation direction, converts linearly polarized light, emitted out during display at the first display time sequence at the second position, into circularly polarized light in a second rotation direction, and converts linearly polarized light, emitted out during display at the subsequent display the subsequent time sequence at the second position, into circularly polarized light in the first rotation direction.

14. The display processing apparatus according to claim 13, wherein different positions in the display image are different rows, different columns, different pixels or different regions; the first position is confidential rows, confidential columns, confidential pixels or confidential regions; and the second position is interference rows, interference columns, interference pixels or interference regions.

15. The display processing apparatus according to claim 13, wherein the first position and the second position are arranged in the form of interleaving at a same interval.

16. A display processing system, comprising: a display device for emitting linearly polarized light, the display processing apparatus according to claim 1, and an analyzer for analyzing the circularly polarized light in the first rotation direction.

17. The display processing system according to claim 16, wherein the analyzer is a pair of analyzer spectacles.

18. A display processing method, comprising:

acquiring information of different display timings of a display device and information of different positions in a display image of the display device, in which the display timings include a first display time sequence point and at least one subsequent display time sequence point; display signals corresponding to the first display time sequence point and the subsequent display sequence point of the display device at a first position in the display image are a display signal of a first image and a display signal second image respectively; display signals corresponding to the first display time sequence point and the subsequent display time sequence point are a display signal of the second image; and converting linearly polarized light, emitted out from the display device during display at the first display time sequence point at the first position, into circularly polarized light in a first rotation direction when the display device displays the display signal of the first image at the first display time sequence point, converting linearly polarized light, emitted out from the display device during display at the at least one subsequent display time sequence point at the first position, into circularly polarized light in a second rotation direction when the display device displays the display signal of the second image at the subsequent display time sequence point, and converting linearly polarized light, emitted out from the device during display at the first display time sequence and at the at least one subsequent display time sequence point at the second position, into circularly polarized light in the second rotation direction when the display device displays the display signal of the second image at the first display sequence time point and the subsequent display time sequence point.

19. A display processing method, comprising:

acquiring display information of different positions in a display image of a display device and information of different display timings of the display device, wherein the display timings include a first display time sequence point and at least one subsequent display time sequence point; and converting linearly polarized light, emitted out from the display device during display at the first display time sequence point at a first position in the display image, into circularly polarized light in a first rotation direction, converting linearly polarized light, emitted out from the display device during display at the subsequent time sequence point at the first position, into circularly polarized light in a second rotation direction, converting linearly polarized light, emitted during display at the first display time sequence point at a second position in the display image, into circularly polarized light in the second rotation direction, and converting linearly polarized light, emitted out from the display device during display at the subsequent display time sequence point at the second position, into circularly polarized light in the first rotation direction, when display signals corresponding to the first position at the first display time sequence point and the subsequent display time sequence point are display signals of the first image and the second image respectively and display signals corresponding to the second position at the first display time sequence point and the subsequent display time sequence are display signals of the second image and the first image respectively.

* * * * *